United States Patent Office 3,534,053
Patented Oct. 13, 1970

3,534,053
QUINUCLIDINE DERIVATIVES
Stephen I. Sallay, Wynnewood, and Scott J. Childress, Philadelphia, Pa., assignors to American Home Products Corporation, New York, N.Y., a corporation of Delaware
No Drawing. Filed May 24, 1967, Ser. No. 640,850
Int. Cl. C07d 39/06
U.S. Cl. 260—294.7                                10 Claims

ABSTRACT OF THE DISCLOSURE

Quinuclidine compounds having 3-phenylimino, 3-phenylamino or 3-phenylamido substituents are prepared which have pharmacological utility as anti-depressant agents. The preparation involves the reaction of a quinuclidine-3-one with an anilino compound, a reduction step, and a final acylation procedure.

BACKGROUND OF THE INVENTION

This invention relates to azabicyclooctane derivatives and more particularly to 3-imino, amino and amido quinuclidines having useful pharmacological activity.

A variety of substituted quinuclidines have been prepared and described in the literature and in the patent art, these compounds being indicated to have medicinal properties, demonstrating for example, sympathomimetic action, central nervous system stimulating activity, anti-inflammatory action, etc. In particular, noted patents in this field are U.S. Pats. 2,868,792; 2,901,486; 2,917,515; 3,118,896; and 3,163,653 and Russian Pat. 167,880 (Derwent No. 17677).

SUMMARY

An object of the present invention is to provide novel quinuclidine derivatives having utility in the pharmacological field. It is a further object of the invention to prepare medically useful quinuclidine derivatives having novel substituents in the 3-position of the quinuclidine ring. Further objects will become apparent in the later description of the invention.

The objectives indicated above are achieved by a series of steps involving the reaction of quinuclidine-3-one with selected arylamines which produces unexpected pharmacologically active arylimino-quinuclidines. These are then reduced to the corresponding arylamino quinuclidines and the latter product is then acylated at the amino nitrogen to form amido quinuclidines. These compounds possess useful pharmacological properties, specifically anti-depressant activity which make them useful in the field of experimental and comparative pharmacology.

DESCRIPTION OF THE INVENTION

The novel quinuclidines of the invention may be illustrated by the following formulae:

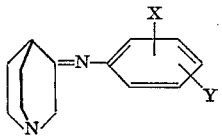

and

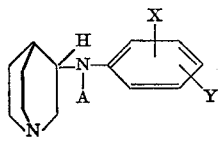

in which X and Y each stand for hydrogen, lower alkyl, lower alkoxy or halogen, but preferably either hydrogen or lower alkoxy, while A represents either hydrogen or an acyl radical, preferably a lower alkanoyl radical.

The compounds are prepared by the following general reaction scheme:

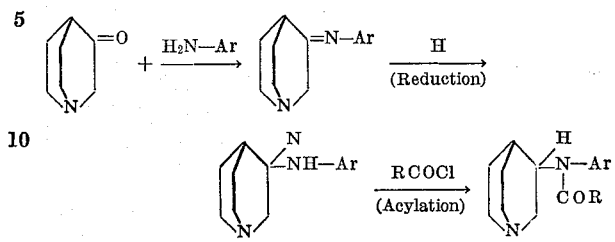

In the above schematic outline, Ar is intended to represent an aryl group, preferably a mono- or di-substituted phenyl such as indicated above, while R represents a hydrocarbon radical but preferably a lower alkyl.

In carrying out the process as illustrated, one starts by initially reacting quinuclidine-3-one or more descriptively, 1-azabicyclo-[2.2.2]-octan-3-one with aniline or ring substituted aniline in a benzenoid solvent and in the presence of a lower alkanoic acid. The reaction is carried out under refluxing conditions until substantially all the water that forms is removed.

The reaction product, a phenylimino quinuclidine is now reduced using an alkali metal borohydride as the reducing agent. The reaction is carried out in an inert solvent which may be dioxane, tetrahydrofuran or preferable a lower alkanol, or alkanol-water mixture, at a temperature in the range of about 0° to 30° C.

The reduced product which is extracted from the reaction mixture of the reduction step is then acylated using a lower alkanoic acid anhydride, in a solvent, preferably pyridine, the reaction being carried out at a temperature in the range from about 0° to 100° C.

The reaction product, an acylamido quinuclidine, is extracted from the reaction mixture using a solvent for the product which can be chloroform, methylene chloride, ether or benzene.

The compounds of the invention may be used either in the form of free bases or salts thereof. Suitable salts may be the hydrochlorides, preferably the hydrochlorides, the maleates, tartrates, oxalates, citrates, phosphates, sulphates, furmarates, or the quaternary ammonium salts, for example, the lower alkyl halides. To prepare these, the base is reacted in a suitable solvent with any pharmaceutically acceptable acid reactant in known manner, so that the salt thus formed will be non-toxic at the dosage used.

In the preparation of pharmaceutical compositions, the active compound may be used with any well-known pharmaceutically acceptable carrier, these being selected for the intended purpose either for oral or parenteral use. Among the carriers that may be used are lactose, starch, the inert carbonates, or similar substances when tablets or capsules are contemplated. Water, vegetable oils, and natural or synthetic gums are also useful when considering parenteral or liquid compositions. Effective pharmacological action is achieved when the compounds of the invention are used in a dosage range from 1 to 40 mg./kg. per day, and preferably from 5 to 30 mg./kg. per day.

The following examples will illustrate the invention in greater detail. Temperatures as given are in the degrees centigrade.

Example 1

1-azabicyclo-[2.2.2]-octan-3-one (1 mole) and aniline (1.1 mole) and 10 ml. of acetic acid were refluxed for 20 hours in 2 l. toluene. Water was azeotropically distilled and separated by a Dean-Stark separator. The reaction mixture was taken to dryness and distilled between 100–130°/0.07 mm. The solidified distillate was recrystallized from n-heptane; yielding the product, 3-phenylimino-1-azabicyclo-[2.2.2]-octane, with M.P. 85–86.5°.

Example 2

Following the procedure of Ex. 1 but using o-anisidine instead of aniline, 3-(o-methoxyphenylimino)-quinuclidine was obtained. It distilled between 130–138°/0.03 mm. The solidified distillate was recrystallized from ligroin; M.P. 90–91.5°.

Example 3

Following the procedure of Ex. 1 but using 3,5-dimethoxyaniline instead of aniline, 3-(3,5-dimethoxyphenylimino)-quinuclidine was obtained. It was distilled between 153–157°/0.04 mm. The distillate was recrystallized from ligroin; M.P. 105–107°.

In place of the mono- or di-methoxyaniline of Examples 2 and 3, or the unsubstituted aniline of Example 1, one may carry out the reaction with a mono- or di-halogen substituted, or a mono- or di-(lower) alkyl substituted phenyl compound and form the coresponding 3-halo or lower alkyl substituted phenylimino quinuclidine. These may later be treated in the same was as described in Examples 4, 8 and 11, hereinbelow.

Example 4

3 - phenylimino-1-azabicyclo - [2.2.2]-octane was dissolved in methanol and reduced with 1 mole equivalent NaBH$_4$ at room temperature for 24 hours. The reaction mixture was taken to dryness, dissolved in water and extracted with chloroform. Dried chloroform solution left back a white solid identified as 3-anilinoquinuclidine which was recrystallized from ligroin; M.P. 116–117.5°. The free base was transformed into its maleate salt; M.P. 166.5–167.5°.

Example 5

Following the procedure of Ex. 4, 3-(o-methoxyphenylimino)-quinuclidine was reduced to form the product 3-(o-ansidino)-quinuclidine tartrate. Its M.P. is 196–197.5°.

Example 6

Also, following the procedure of Ex. 4, 3-(p-methoxyphenylimino)-quinuclidine furnished 3 - (p-anisidino)-quinuclidine tartrate; M.P. 171–173°.

Example 7

Using the procedure of Ex. 4, the compound, 3-(3,5-dimethoxyphenylimino)-quinuclidine was reduced to 3-(3-5-dimethoxyanilino)-quinuclidine; M.P. 110–112°.

Example 8

The compound, 3-anilinoquinuclidine (10 g.) was dissolved in 100 ml. of dry pyridine and treated with acetic anhydride (15 ml.). The reaction mixture was stored at room temperature over night and then evaporated to dryness. The residue was dissolved in chloroform and washed with water, saturated NaHCO$_3$ solution, dried and evaporated. The yellow oil was transformed into its oxalate salt yielding the product, 3-(N-phenylacetamido)-quinuclidine oxalate; M.P. 159–161° (dec.).

Example 9

Following the procedure of Ex. 8 but using the compound, 3 - (o-anisidino)-quinuclidine, 3-[N-(o-methoxyphenyl)-acetamido]-quinuclidine tartrate was isolated. It melted at 196–197°.

Example 10

Following the procedure of Ex. 8 but using the compound, 3-(p-anisidino)-quinuclidine, N-(p-methoxyphenyl)-3-acetamido-quinuclidine was isolated. M.P. 98–99.5°.

Example 11

The product of Ex. 6, 3-(p-anisidino)-quinuclidine, (4.6 g.) was acylated with propionic anhydride (2.5 g.) in in pyridine (40 ml.) on a steam bath (24 hours). The reaction mixture was evaporated to dryness and extracted with chloroform. The chloroform solution was washed with saturated NaHCO$_3$ solution, dried and distilled at 172–174°/0.04 mm. The distillate solidified and was recrystallized from ligroin. The product, N-(p-methoxyphenyl)-N-(3 - quinuclidinyl)-propionamide, melted at 80–81°.

Example 12

Following the procedure of Ex. 11, 3-(3,5-dimethoxyanilino)-quinuclidine was acylated with propionic anhydride and furnished N-(3,5-dimethoxyphenyl)-N-(3-quinuclidinyl)-propionamide; B.P. 188–190°/0.04 mm.

Example 13

Following the procedure of Example 11, 3-(o-anisidino)-quinuclidine was acylated with propionic anhydride. The free base: N-(o-methoxyphenyl)-N(3-quinuclidinyl)-propionamide boiled at 162–165°/0.04 mm. The oily distillate crystallized upon standing and melted at 99–101°.

The invention claimed is:
1. 3-(o-methoxyphenylimino)-quinuclidine.
2. 3-(3,5-dimethoxyphenylimino)-quinuclidine.
3. 3-(o-anisidino)-quinuclidine.
4. 3-(p-anisidino)-quinuclidine.
5. 3-(3,5-dimethoxyanilino)-quinuclidine.
6. 3-[N-(o-methoxyphenyl)-acetamido]-quinuclidine.
7. 3-[N-(p-methoxyphenyl)-acetamido-quinuclidine.
8. 3 - [N-(3,5 - dimethoxyphenyl)-propionamido]-quinuclidine.
9. 3 - [N-(p-methoxyphenyl)-propionamido]-quinuclidine.
10. 3 - [N-(o-methoxyphenyl)-propionamido]-quinuclidine.

References Cited

Mikhlina et al., Chem. of Hetero. Cmpds. 2(2), 172–6 (1966).

HENRY R. JILES, Primary Examiner

G. T. TODD, Assistant Examiner

U.S. Cl. X.R.

260—999